United States Patent [19]
Friede et al.

[11] Patent Number: 5,138,627
[45] Date of Patent: Aug. 11, 1992

[54] PREIONIZATIOND DEVICE, IN PARTICULAR FOR X-RAY PREIONIZATION IN DISCHARGE-PUMPED GAS LASERS, IN PARTICULAR EXCIMER LASERS

[75] Inventors: Dirk Friede, Goldbach; Willi Bette, Erlangen, both of Fed. Rep. of Germany

[73] Assignee: Siemens Aktiengesellschaft, Munich, Fed. Rep. of Germany

[21] Appl. No.: 601,277

[22] Filed: Oct. 22, 1990

Related U.S. Application Data

[63] Continuation of Ser. No. 000,261, Apr. 24, 1989.

[30] Foreign Application Priority Data

Apr. 22, 1988 [DE] Fed. Rep. of Germany ....... 3813715

[51] Int. Cl.$^5$ ............................................. H04S 3/097
[52] U.S. Cl. ........................................ 372/86; 372/38; 372/37; 372/57
[58] Field of Search ................... 372/38, 86, 57, 37

[56] References Cited

U.S. PATENT DOCUMENTS 4,611,327 9/1986 Clark et al. ............................. 378/86
4,837,773 6/1989 Wakata et al. ......................... 378/38
4,975,921 12/1990 Rothe ................................... 378/38

Primary Examiner—Léon Scott, Jr.
Attorney, Agent, or Firm—Herbert L. Lerner; Laurence A. Greenberg

[57] ABSTRACT

A preinoization device, in particular for X-ray preionization in discharge-pumped gas lasers, especially excimer lasers, is connected to a pulse generating network of an excitation circuit for gas lasers. A high voltage pulse transformer has a primary winding connected between a storage capacitor and a high-voltage switch in the pulse generating network. The pulse transformer emits preionizing pulses on the secondary side that lead to the firing of the laser glow discharge for a preionizing device, in particular an X-ray tube. The pulse transformer is constructed for this purpose as a saturable magnetic inductor with at least one secondary winding. If the high voltage switch is closed, when the pulse transformer is unsaturated its primary winding has its maximum inductance, so that there will be a secondary side voltage pulse at this time because of the law of induction. After a pre-set delay or retardation time of 50-100 ns, for example, the core will be saturated, the inductance of the primary winding will drop rapidly, and the full current will flow within the inversion circuit, so that the full high voltage builds up on the laser electrodes in order to fire the glow discharge.

7 Claims, 3 Drawing Sheets

PREIONIZATIOND DEVICE, IN PARTICULAR FOR X-RAY PREIONIZATION IN DISCHARGE-PUMPED GAS LASERS, IN PARTICULAR EXCIMER LASERS

CROSS-REFERENCE TO RELATED APPLICATION

This application is a continuation of International Application Ser. No. PCT/DE89/00261, filed Apr. 24, 1989.

The invention relates to a preionization device, in particular for X-ray preionization in discharge-pumped gas lasers, especially excimer lasers, with a pulse generating network of the laser excitation circuit and with a high voltage pulse transformer having a primary winding connected between a storage capacitor and a high voltage switch in the pulse generating network of the laser excitation circuit.

It is the task of such a device to obtain the preionization high voltage pulses, in particular for preionization by means of an X-ray tube, in a less costly manner. This means that it must be possible to incorporate the pulse transformer that is involved in the reproduction of preionization high voltage pulses into the pulse generating network without its function being disrupted thereby. On the contrary, it must enhance the overall function, and it must be possible to achieve the timing, i.e., the desired lead time of the preionization pulses with reference to the actual firing of the laser glow discharge, in as simple a manner as possible.

It is accordingly an object of the invention to provide a preionization device, in particular for x-ray preionization in discharge-pumped gas lasers, especially excimer lasers, which overcomes the disadvantages of the heretofore-known devices of this general type.

With the foregoing and other objects in view there is provided, in accordance with the invention, in a discharge-pumped gas laser including a laser excitation circuit having a pulse generating network with a storage capacitor and a high voltage switch, a preionization device comprising a high voltage pulse transformer in the form of a saturable inductor having a primary winding connected between the storage capacitor and the high voltage switch and at least one secondary-side winding in which a high voltage pulse for triggering the preionization device is induced.

In accordance with another feature of the invention, the high voltage pulse transformer has a core formed of saturable core material and a reset winding on the core for eliminating residual magnetism therein by reverse magnetization after a magnetizing process of the saturable core material. In accordance with a further feature of the invention, said high voltage pulse transformer has a core formed of saturable core material and the primary side high voltage winding is connected parallel to the high voltage switch at a pole of a high voltage power supply, so that a charge current from the high voltage power supply flows through the primary winding in the opposite direction as compared to a discharge current of said storage capacitor so as to return the saturable core material to a low point on its hysteresis loop.

In accordance with an added feature of the invention, the pulse generating network is based on an LC inversion circuit.

In accordance with an additional feature of the invention, the pulse generating network is based on a charge transfer circuit.

In accordance with a concomitant feature of the invention, the pulse generating network is connected as an inversion charge transfer switching circuit.

The advantages that can be gained by using the present invention are mainly that the high voltage pulse transformer, which is equipped as a saturable inductance, i.e., with a saturable core material, is a structural element that transmits leading high-voltage pulses to supply the laser X-ray preionization when in the unsaturated state on one hand, and is inductive at such a low level that operation of the laser excitation circuit is not affected when in the saturated state on the other hand. In addition, the high voltage switch of the laser excitation circuit is protected since it does not have to handle the full current when it is closed, because of the initially high inductivity of the primary winding of the high voltage pulse transformer.

Other features which are considered as characteristic for the invention are set forth in the appended claims.

Although the invention is illustrated and described herein as embodied in a preionization device, in particular for x-ray preionization in discharge-pumped gas lasers, in particular excimer lasers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Before discussing the drawings in detail, some observations of a general nature will be made.

Effective preionization is of particular importance for the operation of discharge-pumped excimer lasers. This can be formed, for example, from UV preionization by auxiliary spark discharges or corona discharges in the vicinity of the laser discharge gap, or as X-ray preionization, during which X-ray tubes are then advantageously integrated into the laser head, when the X-ray radiation enters the laser chamber through one of the laser electrodes, for example. For reasons of cost, the acceleration voltage for the X-ray tube, of 50 to 100 kV, is to be generated with the lowest possible resource expenditures.

Figure 1:
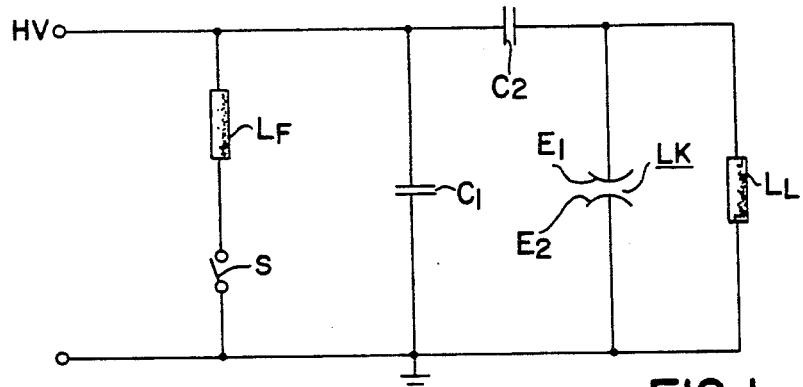
FIG. 1 is schematic circuit diagram of a prior art device.

Referring now to the figures of the drawings in detail and first, particularly, to FIG. 1 thereof, there is seen, in simplified form, an electrical circuit with which an excimer laser LK with laser electrodes $E_1$, $E_2$ is excited by an LC inversion circuit. Reference symbols $C_1$ and $C_2$ represent capacitors, and reference symbol S represents a switching element in the form of a high voltage switch, which will be referred to below as a switch for reasons of simplification, e.g., a spark gap or a thyratron. The two capacitors are charged in parallel from an external high voltage power supply HV. During the charging process, the laser is short-circuited by a choke $L_L$. Reference symbol $L_F$ represents an inductance in series with the switch S that can be a compensating inductance and/or a separate choke.

When the switch S closes, the voltage at the capacitor $C_1$ swings to the opposite polarity. This means that the voltage across the laser electrodes $E_1$, $E_2$ rises and the laser gas breaks through. Due to its great inductance, the choke $L_L$ has no effect on the rapid swing.

The X-ray light must be radiated in for preionization while the voltage on the laser electrodes $E_1$, $E_2$ is rising. The acceleration voltage of the X-ray tube is to be tapped off from the laser head power supply. A circuit in which a high voltage pulse transformer is incorporated in the inversion circuit with elements $C_1$, $L_F$, and S is described in the literature on $CO_2$ lasers, as seen in an article entitled A Sealed High-Repetition-Rate TEA $CO_2$ Laser by P. W. Pace and M. Lacombe in IEEE Journal of Quantum Electronics, Vol. QE-14, No. 4, April 1978, pp. 263–274 and in particular on page 267. Such a circuit is suitable for $CO_2$ lasers because of the longer voltage rise times, so that the increase of inductance, which causes the inclusion of the pulse transformer, can be accepted. Due to the necessary rapid voltage rise times, a circuit with such a pulse transformer cannot be used in excimer lasers.

Figure 2:
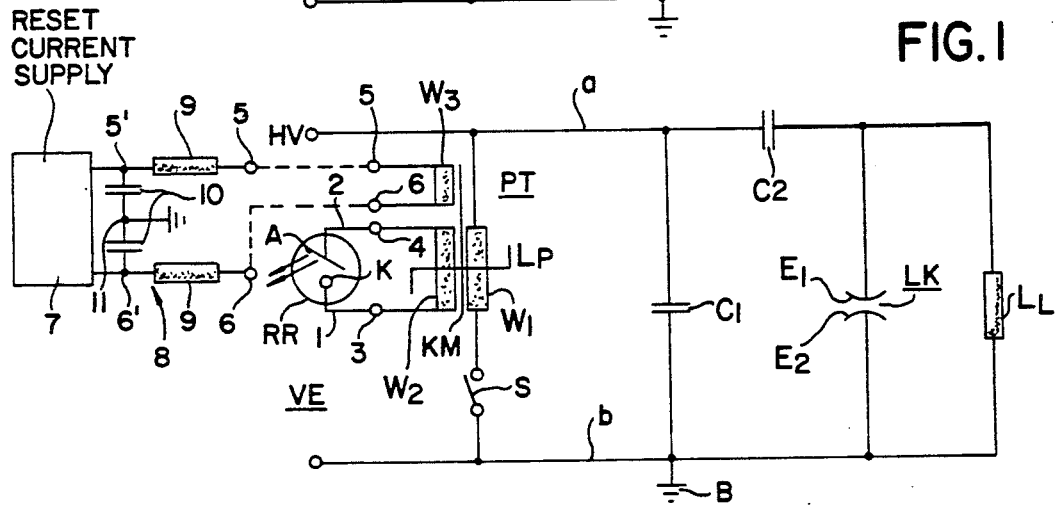
FIGS. 2, 4, 5 and 6 are views similar to FIG. 1 showing several embodiments of a device according to the invention.

The object of the invention is to provide a preionization device with a pulse transformer, which can also be incorporated in the laser excitation circuit, and has a core material which is saturable, in contrast to the configurations known from the literature. A circuit according to the present invention is shown in FIG. 2. The parts which are the same as those used in FIG. 1 bear the same reference symbols. It can be seen that in place of the inductance $L_F$, which represents a conventional pulse transformer, a saturable magnetic inductance in the form of a pulse transformer PT has been provided, and that this pulse transformer PT has at least one secondary-side winding $W_2$ in addition to a primary winding $W_1$. The high voltage pulse that triggers a preionization device VE is induced in this secondary winding. According to a preferred embodiment, which is shown diagrammatically, an X-ray tube RR with a cathode K and a retarding anode A is built into a housing of the laser chamber LK in a spatial realization, in such a way that its X-ray radiation (indicated by arrows) radiates into the laser discharge volume. This X-ray tube is connected through respective feed lines 1, 2 to respective terminals 3, 4 of the secondary winding $W_2$, which carry the X-ray voltage. Reference symbol KM indicates the saturable core material, and reference symbol $L_p$ indicates the inductance of the saturable pulse transformer PT. The production, composition, and properties of the ferromagnetic core material used for pulse transformers of this kind is described, for instance, in an article in Scientific American, April 1980, pp. 84–96, and in U.S. Pat. No. 4,275,317. In FIG. 2, reference symbol B indicates a ground connection for a lower, ground-side potential bus b, and reference symbol a indicates an upper high voltage side potential bus. Fundamentally, the circuits shown in FIG. 2, as well as in FIGS. 4 to 6, also function during a change in potential.

At the start of the switching process, closing the switch S means that the core of the pulse transformer is unsaturated (the means through which this can be achieved as well as other circuit variations, are described below).

The primary winding $W_1$ of the pulse transformer PT is therefore at its maximal inductance $L_p$, so that at this time there will be a secondary-side pulse because of the law of inductance, having a level which can be influenced by the number of secondary windings, and which is suitable for triggering the X-ray tube RR that emits X-ray radiation for preionization of the laser gas. Due to the high inductance, only a relatively low current flows and the voltage rise at the electrodes is retarded. Selection of the core material and the geometrical dimensions make it possible to ensure that the core is saturated after a specified time, e.g., 50–100 ns. The inductance $L_p$ of the primary winding $W_1$ drops to a small residual value, so that the full current then flows within the inversion circuit and the voltage across the electrodes $E_1$, $E_2$ rises rapidly, as is required for operation of excimer lasers. At the same time, because of the sharply reduced inductance, no more voltage is induced at the secondary side, and for this reason the high voltage pulse ends.

Figure 3:
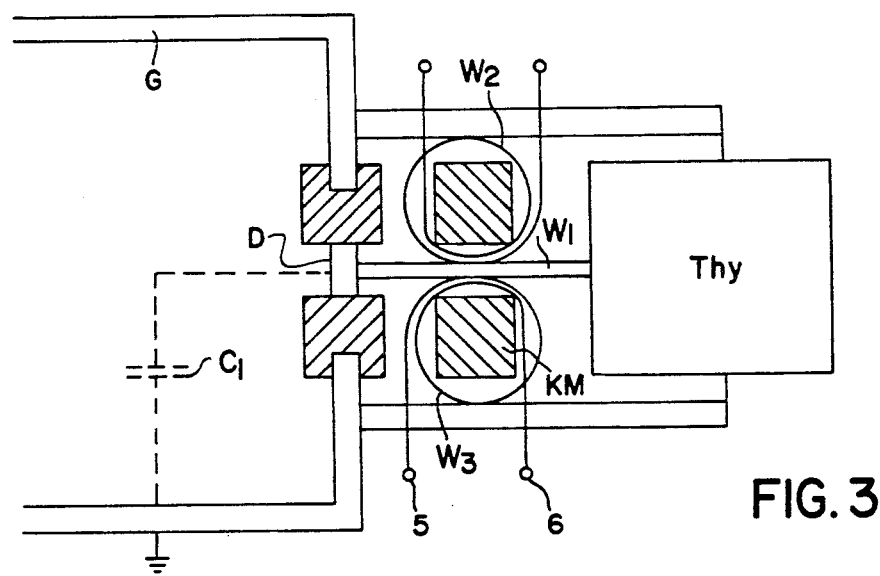
FIGS. 3 and 7 are fragmentary, diagrammatic, sectional views of the device according to the invention.

In this way, a high voltage pulse is generated through the laser electrodes $E_1$, $E_2$, it is timed to synchronize with the voltage rise, and it is being performed without any significant reduction of the voltage rise time speed. A condition for achieving a high voltage rise time speed is the smallest possible residual inductance in the inversion circuit. In practice, the primary winding $W_1$ is formed by the current feed and return lines that result from the geometrical dimensions. FIG. 3 shows a thyratron Thy as a switch, a high voltage leadthrough D passing through a wall of a laser housing G, and the saturable core material KM being installed in the form of a ring in the normally unused space between the current carrying components. The secondary winding $W_2$, which can include a plurality of windings, is applied round the core material KM and led out at a suitable location between the current feeds. Such a construction is extremely compact and makes use of the always available surfaces between the current feeds around which current flows, by installing a core as a primary winding of a high voltage transformer.

Figure 4:
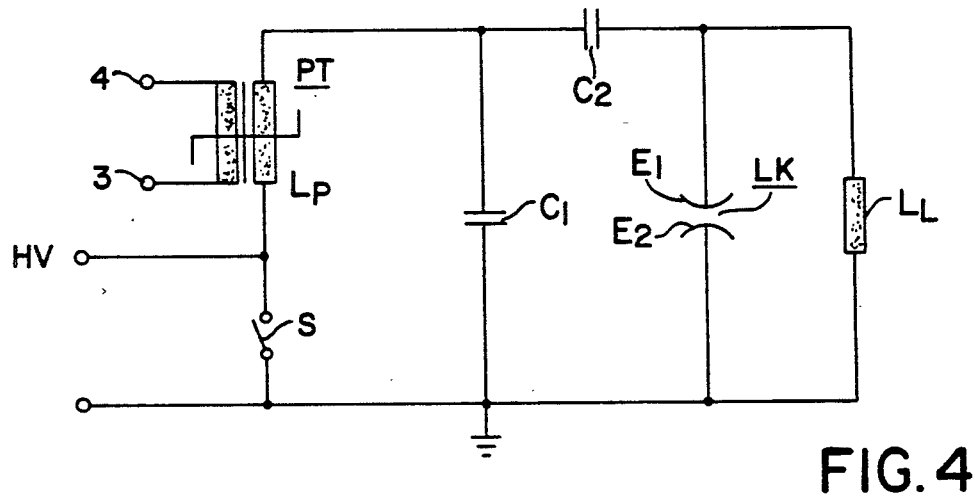

It is a condition for the process described above that the magnetic core material has very little or no residual magnetism. In the other case, the core would become permanently saturated after a single cycle of the processes. In that case, the core would have to be reset, i.e., into the unsaturated or the oppositely saturated state. This can be performed by installing an additional reset winding or by connection to a high voltage power supply ahead of the transformer, as seen in FIG. 4. In this case, the charging current flows from the high voltage power supply HV in a direction that is opposite as compared to a discharge current of said storage capacitor $C_1$ through the primary winding of the pulse transformer PT in order to thereby bring the core or core material KM into the opposite saturated state or (b)—at least—to return it to a low point on its hysteresis loop. After the switch has been closed, the core—according to case (a)—must first go from the saturated into the unsaturated state before the above-described process can take place. The bipolar induction stroke of the core can thereby be exploited, and in addition thereto the high voltage pulse is delayed. The additional embodiment of a reset winding $W_3$ having a similar function as just explained will be described later.

It is also possible to ensure by suitable selection of the space factor, i.e., the ratio of core surface to surface of the primary winding, that a high level of current flows in the high induction phase as well, so that the voltage on the laser electrodes rises faster while the high voltage pulse is being generated. As a result of this, the time of the high voltage pulse moves closer to the laser breakthrough.

Figure 5:
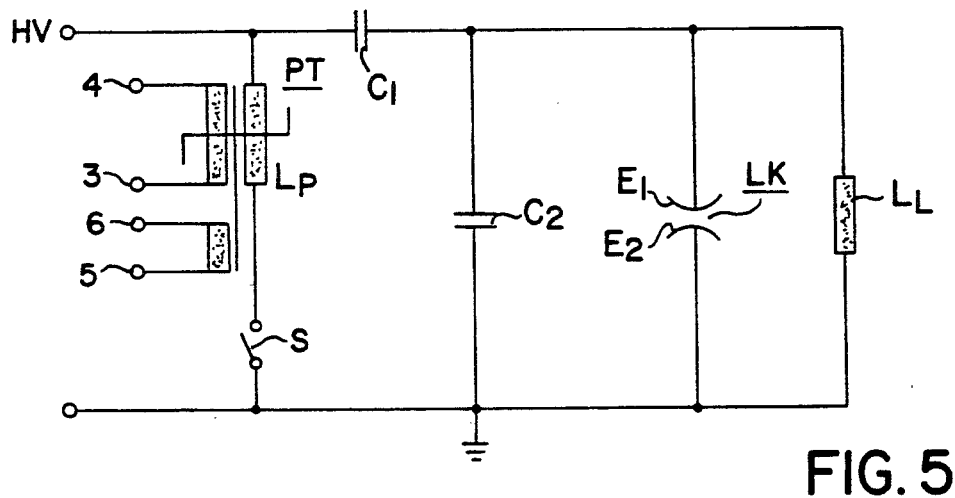
Figure 6:
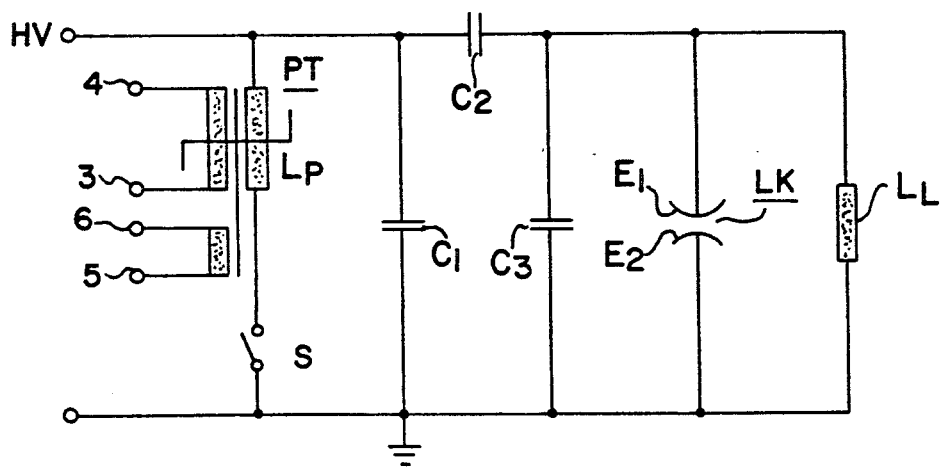

The saturable pulse transformer described heretofore can be incorporated into the laser excitation circuit using other circuit technology. As an example, FIG. 5 shows a so-called charge transfer circuit and FIG. 6 shows a so-called inversion charge transfer circuit. In particular, European Patent No. 0 130 443 B1, corresponding to U.S. Pat. No. 4,573,160, in particular FIG. 5 thereof, describes the above two types of circuits in greater detail, together with an LC inversion circuit, such as that which forms the basis for FIG. 2 and FIG. 4 of the present application, so that these structures can be disregarded in this case.

The location at which the pulse transformer is to be incorporated is not established at the very outset. It is important for a notable voltage drop to be caused across the primary winding $W_1$ during the switching process. Laser excitation circuits that are fitted with so-called magnetic switches are seen in Appl. Phys. Lett. 40 (7) of Apr. 1, 1982, pp. 547 and 548. A work by I. Smilanski et al that is published therein and is entitled: "Electrical excitation of an XeCl laser using magnetic pulse compression", can also be provided therewith by the incorporation of a second winding on the core material with a saturable pulse transformer in the sense of this invention. In this case, too, it is unimportant where the circuit of the magnetic switch that is configured as a pulse transformer is located.

All conceivable switch types can be used in the circuits described heretofore as the primary switch element S. These can include thyratrons, spark gaps, pseudo-spark gaps, and light-conducting switches. The operating principle of the saturable pulse transformer on which the present invention is based only requires the presence of a switching process, regardless of how it is produced.

Figure 7:
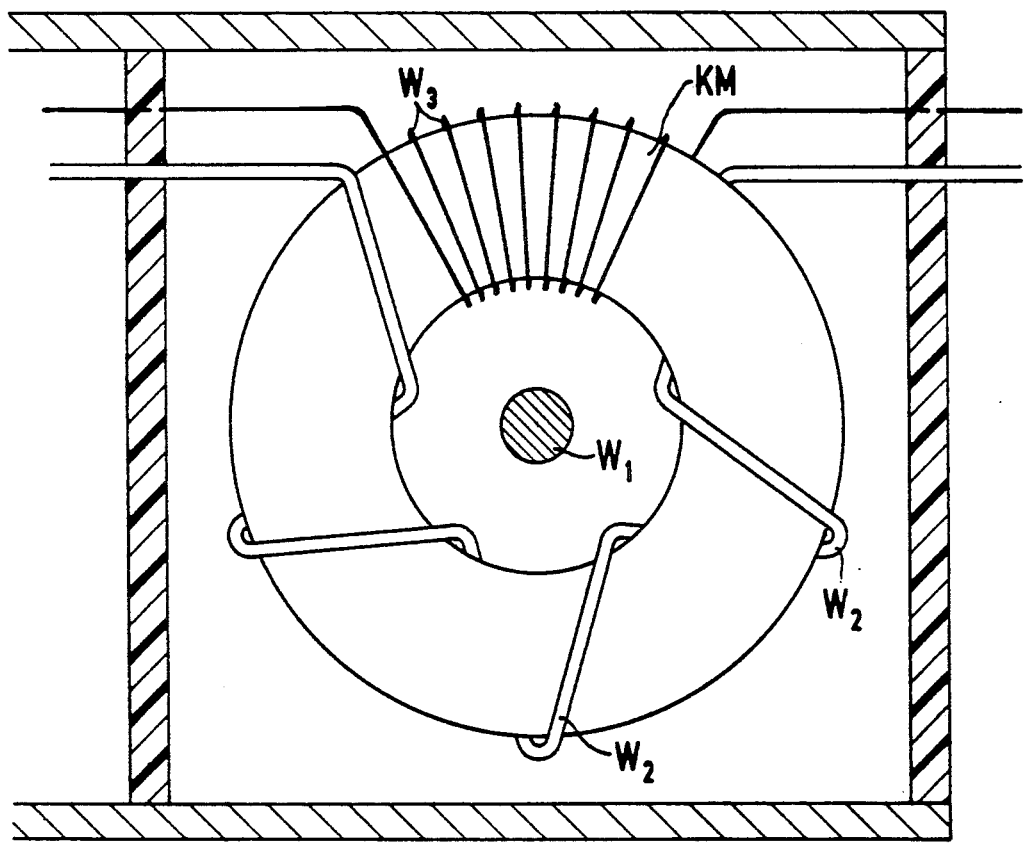

The insulation of the core material from the windings and the windings from each other can be effected by means of solid dielectric. However, at the high electrical field strengths that occur, there can be corona effects under some circumstances, even with a carefully prepared dielectric, and these effects can lead to the destruction of the pulse transformer. In addition, at high repetition rates and at high average powers, a solid dielectric can make the removal of unavoidable lost heat from the core of the magnet extremely difficult. For this reason, the pulse transformer can be operated with a liquid dielectric (e.g., oil or fluorinated hydrocarbons). The secondary windings are configured in such a way as to be self-supporting, as is described in German Published, Non-Prosecuted Application DE-OS 35 29 915 A1, corresponding to U.S. Pat. No. 4,763,093. The insulating liquid permits problem-free removal of lost heat from the core, dielectric, and windings, e.g., by convection or by circulation. An embodiment of a saturable pulse transformer with a self-supporting secondary winding $W_2$ is shown in cross-section in FIG. 7, wherein a conductor for the primary winding $W_1$ having a relative large cross-section passes through the annular core KM. The preionization device VE, which preferably incorporates an X-ray tube RR, is only shown in detail in FIG. 2. In the remaining FIGS. 4 to 6, only the connector terminals 3, 4 on the secondary side of the pulse transformer PT, to which the preionization device can be connected, are shown. Fundamentally, preionization rods can also be used as a preionization device. These rods operate on the principle of corona discharge and generate UV light within the laser chamber. Auxiliary spark discharge gaps are also suitable as preionization devices, with UV light being generatable by the discharge sparks of thereof. In the two last-mentioned cases, the voltage pulses on the secondary side of the pulse transformer PT do not have the height that is needed during operation of an X-ray tube RR which operates, for example, with voltage pulses of 50 to 100 kV. Voltage pulses of 25 to 30 kV, for example, are sufficient. The turn ratio $W_1/W_2$ of the pulse transformer PT is to be matched accordingly. Preionization devices that generate the required starting charge carrier densities by generating UV light within the laser charge volume are described, for example, in German Published, Non-Prosecuted Applications DE-OS 30 35 702 A1, 30 35 730 A1 and 33 14 157 A1, so that there is no requirement for a more detailed explanation in this case.

It should be mentioned that in the case of the invention, in the inversion charge circuit (ITC) shown in FIG. 6, a capacitor $C_3$ has been added. The capacitor $C_3$ is connected in parallel to the gap of the laser electrodes $E_1$-$E_2$, with the capacitors C, $C_2$, and $C_3$ being added into the pulse generating network in the manner of the letter $\pi$, i.e., each of the two capacitors $C_1$, $C_3$ that lie in cross branches are connected to each other on the power side by the "long branch capacitor" $C_2$ and on the ground side by the ground bus.

FIG. 2 shows that the core KM of the pulse transformer PT is provided with a reset winding $W_3$ having two terminal posts 5, 6. Connected to the terminal posts 5, 6 is a reset current supply unit 7 (hereinafter called "unit") via a low-pass filter 8, the latter protecting the unit 7 against high frequency portions of the fast high voltage pulses being induced within the reset winding $W_3$. The low-pass filter is a quadripole having two series branches between the poles 5'—5 and 6'—6, respectively. In each of those two series branches there is inserted an inductance coil 9, the impedance of which is high with respect to the high frequency pulses appearing at the terminal posts 5, 6, and low with respect to the dc-supply current delivered by the unit 7. The low-pass filter 8 further comprises a shunt branch with two serially connected capacitors 10, the center tap of which being grounded. For the sake of clarity, the unit 7 and its low-pass filter 8 has been depicted remote from the reset winding $W_3$, dotted lines symbolizing the connection to the reset winding $W_3$.

In a simplified manner, i.e. without the unit 7 and the low-pass filter 8, reset windings $W_3$ are shown in FIGS. 3, 5, 6 and 7.

It may be mentioned that the reset winding $W_3$ is being controlled by timing pulses according to the charging and discharging periods of the pulse forming network, preferably within those time intervals when switch S after lasing action has already been opened but not been closed yet. A suitable control switch, preferably an electronic switch, adapted to close and open the circuit branch of the reset winding in order to let the reset current flow through the reset winding $W_3$ or to interrupt it, is not depicted in the drawing.

We claim:

1. In a discharge-pumped gas laser including a laser excitation circuit having a pulse generating network with a storage capacitor and a high voltage switch, a preionization device comprising a high voltage pulse transformer in the form of a saturable inductor having a primary winding connected between the storage capacitor and the high voltage switch and at least one secondary-side winding in which a high voltage pulse for triggering the preionization device is induced.

2. A device according to claim 1, wherein said high voltage pulse transformer has a core formed of saturable core material and a reset winding on said core for eliminating residual, magnetism therein by reverse magnetization after a magnetizing process of said saturable core material.

3. A device according to claim 1, wherein said high voltage pulse transformer has a core formed of saturable core material and said primary side high voltage winding is connected parallel to the high voltage switch at a pole of a high voltage power supply, so that a charge current from the high voltage power supply flows through said primary winding in the opposite direction as compared to a discharge current of said storage capacitor so as to either return the saturable core material to a low point on its hysteresis loop or to bring it into the opposite saturable state.

4. A device according to claim 1, wherein the pulse generating network is based on an LC inversion circuit.

5. A device according to claim 1, wherein the pulse generating network is based on a charge transfer circuit.

6. A device according to claim 1, wherein the pulse generating network is connected as an inversion charge transfer switching circuit.

7. In a discharge-pumped excimer laser including a laser excitation circuit having a pulse generating network with a storage capacitor and a high voltage switch, an X-ray preionization device comprising a high voltage pulse transformer in the form of a saturable inductor having a primary winding connected between the storage capacitor and the high voltage switch and at least one secondary-side winding in which a high voltage pulse for triggering the preionization device is induced.

* * * * *